(12) United States Patent
Coimbatore Natarajan et al.

(10) Patent No.: US 11,159,343 B2
(45) Date of Patent: Oct. 26, 2021

(54) CONFIGURING TRAFFIC OPTIMIZATION USING DISTRIBUTED EDGE SERVICES

(71) Applicant: VMware, Inc., Palo Alto, CA (US)

(72) Inventors: Vijai Coimbatore Natarajan, San Jose, CA (US); Harish Manoharan, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/573,906

(22) Filed: Sep. 17, 2019

(65) Prior Publication Data

US 2021/0067413 A1 Mar. 4, 2021

Related U.S. Application Data

(60) Provisional application No. 62/894,627, filed on Aug. 30, 2019.

(51) Int. Cl.
*H04L 12/66* (2006.01)
*H04L 12/46* (2006.01)
(Continued)

(52) U.S. Cl.
CPC .......... *H04L 12/66* (2013.01); *H04L 12/4633* (2013.01); *H04L 41/0806* (2013.01);
(Continued)

(58) Field of Classification Search
CPC . H04L 41/0806; H04L 41/0893; H04L 12/66; H04L 63/0254; H04L 47/20; H04L 47/125
See application file for complete search history.

(56) References Cited

U.S. PATENT DOCUMENTS

| 5,504,921 A | 4/1996 | Dev et al. |
| 5,550,816 A | 8/1996 | Hardwick et al. |
| (Continued) | | |

FOREIGN PATENT DOCUMENTS

| EP | 1653688 A1 | 5/2006 |
| JP | 2003069609 A | 3/2003 |
| (Continued) | | |

OTHER PUBLICATIONS

Casado, Martin, et al., "Virtualizing the Network Forwarding Plane," Dec. 2010, 6 pages.
(Continued)

*Primary Examiner* — Emmanuel L Moise
*Assistant Examiner* — Xiang Yu
(74) *Attorney, Agent, or Firm* — Adelli LLP

(57) ABSTRACT

Some embodiments provide a novel method for configuring managed forwarding elements (MFEs) to handle data messages for multiple logical networks that are implemented in a data center at the MFEs and to provide gateway service processing (e.g., firewall, DNS, etc.). A controller, in some embodiments, identifies logical networks implemented in the datacenter and MFEs available to provide gateway service processing and assigns gateway service processing for each logical network to a particular MFE. The MFEs, in some embodiments, receive data messages from endpoints in the logical networks that are destined for an external network. In some embodiments, the MFEs identify that the data messages require gateway service processing before being sent to the external network. The MFEs, in some embodiments, identify a particular MFE that is assigned to provide the gateway service processing for logical networks associated with the data messages.

20 Claims, 10 Drawing Sheets

(51) Int. Cl.
*H04L 12/803* (2013.01)
*H04L 12/813* (2013.01)
*H04L 12/24* (2006.01)
*H04L 29/06* (2006.01)
*H04L 29/08* (2006.01)

(52) U.S. Cl.
CPC ........ *H04L 41/0893* (2013.01); *H04L 47/125* (2013.01); *H04L 47/20* (2013.01); *H04L 63/0254* (2013.01); *H04L 67/10* (2013.01)

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,302,484 B1 * | 11/2007 | Stapp ................ H04L 29/12273 345/543 |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,958,298 B2 | 2/2015 | Zhang et al. |
| 9,059,999 B2 | 6/2015 | Koponen et al. |
| 10,063,458 B2 | 8/2018 | Zhang et al. |
| 10,212,071 B2 | 2/2019 | Kancherla et al. |
| 10,693,763 B2 | 6/2020 | Zhang et al. |
| 10,742,746 B2 | 8/2020 | Kancherla et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0225857 A1 | 12/2003 | Flynn et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |

(56) References Cited

U.S. PATENT DOCUMENTS

| | | |
|---|---|---|
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0175125 A1 | 7/2010 | McDysan |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalai et al. |
| 2011/0026537 A1 | 2/2011 | Kolhi et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0145390 A1 | 6/2011 | Kakadia et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0039338 A1 | 2/2012 | Morimoto |
| 2012/0096159 A1 | 4/2012 | Short et al. |
| 2012/0131643 A1 | 5/2012 | Cheriton |
| 2012/0144014 A1 | 6/2012 | Natham et al. |
| 2012/0173757 A1 | 7/2012 | Sanden |
| 2012/0182992 A1 | 7/2012 | Cowart et al. |
| 2012/0236734 A1 | 9/2012 | Sampath et al. |
| 2012/0278802 A1 | 11/2012 | Nilakantan et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0058346 A1 | 3/2013 | Sridharan et al. |
| 2013/0142048 A1 | 6/2013 | Gross, IV et al. |
| 2013/0145002 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0201989 A1 | 8/2013 | Hu et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0195666 A1 | 7/2014 | Dumitriu et al. |
| 2014/0310418 A1 | 10/2014 | Sorenson et al. |
| 2015/0103838 A1 | 4/2015 | Zhang et al. |
| 2015/0189009 A1 | 7/2015 | Bemmel |
| 2015/0271303 A1 | 9/2015 | Neginhal et al. |
| 2016/0198003 A1 | 7/2016 | Luft |
| 2016/0226762 A1* | 8/2016 | Zhang ............... H04L 12/66 |
| 2016/0380812 A1 | 12/2016 | Chanda et al. |
| 2017/0317954 A1* | 11/2017 | Masurekar ............ H04L 45/04 |
| 2018/0063231 A1 | 3/2018 | Park |
| 2018/0176124 A1 | 6/2018 | Kancherla et al. |
| 2018/0176307 A1 | 6/2018 | Kancherla et al. |
| 2019/0014032 A1 | 1/2019 | Zhang et al. |
| 2019/0173757 A1 | 6/2019 | Hira et al. |
| 2020/0366741 A1 | 11/2020 | Kancherla et al. |

FOREIGN PATENT DOCUMENTS

| | | |
|---|---|---|
| JP | 2003124976 A | 4/2003 |
| JP | 2003318949 A | 11/2003 |
| WO | 2005112390 A1 | 11/2005 |
| WO | 2008095010 A1 | 8/2008 |

OTHER PUBLICATIONS

Dumitriu, Dan Mihai, et al., (U.S. Appl. No. 61/514,990), filed Aug. 4, 2011, 31 pages.

Koponen, Teemu, et al., "Network Virtualization in Multi-tenant Datacenters," Technical Report TR-2013-001E, Aug. 2013, 22 pages, VMware, Inc., Palo Alto, CA, USA.

Non-Published Commonly Owned Related International Patent Application PCT/US2020/043633 with similar specification, filed Jul. 25, 2020, 39 pages, VMware, Inc.

Non-Published Commonly Owned Related U.S. Appl. No. 16/573,874 with similar specification, filed Sep. 17, 2019, 37 pages, VMware, Inc.

Non-Published Commonly Owned U.S. Appl. No. 16/945,746, filed Jul. 31, 2020, 67 pages, Nicira, Inc.

Wang, Anjing, et al., "Network Virtualization: Technologies, Perspectives, and Frontiers," Journal of Lightwave Technology, Feb. 15, 2013, 15 pages, IEEE.

PCT International Search Report and Written Opinion of Commonly Owned International Patent Application PCT/US2020/043633, dated Nov. 9, 2020, 16 pages, International Searching Authority (EPO).

* cited by examiner

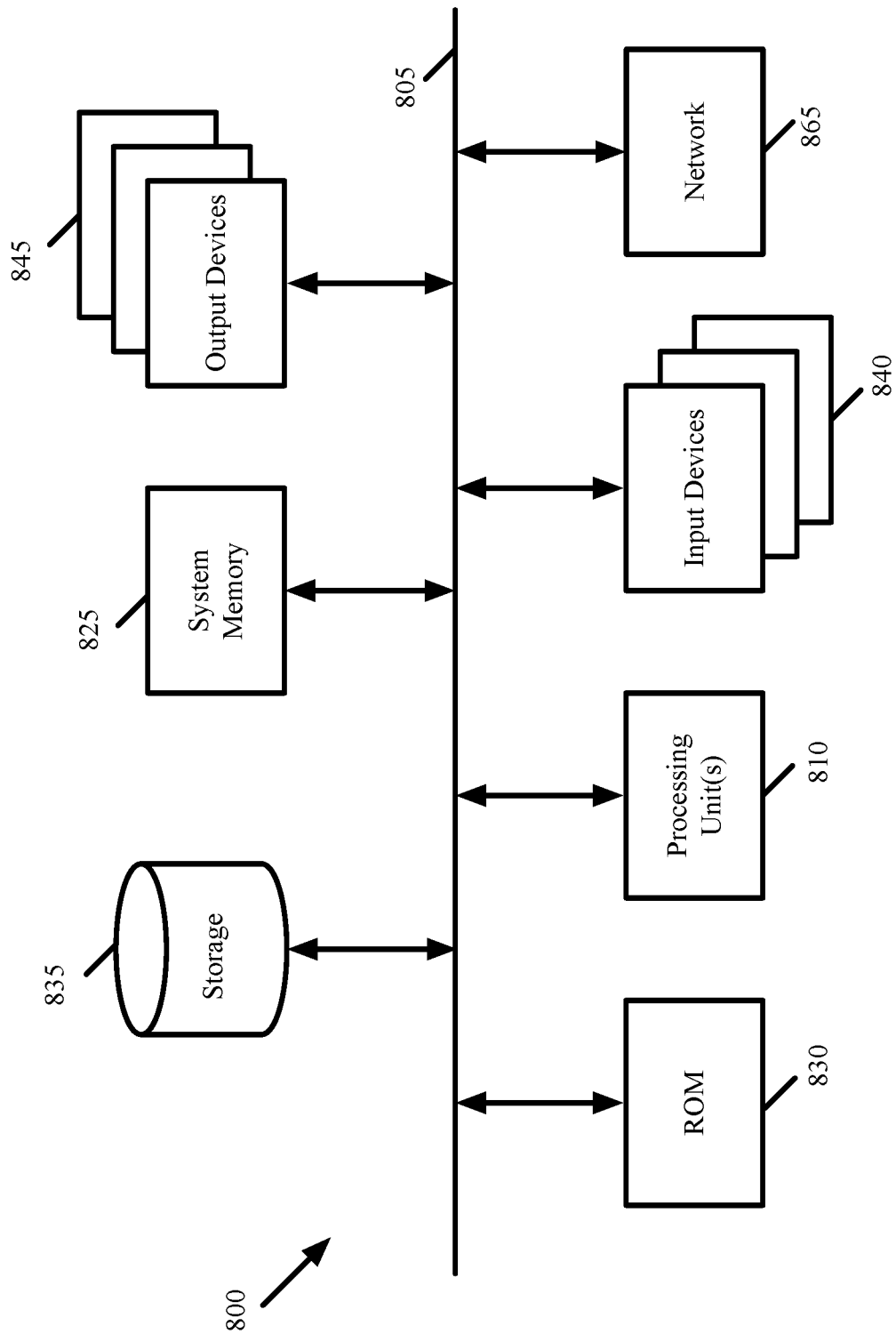

CONFIGURING TRAFFIC OPTIMIZATION USING DISTRIBUTED EDGE SERVICES

BACKGROUND

An edge device in a datacenter may have several functionalities, including applying services such as virtual private network (VPN), network address translation (NAT), edge firewall, etc. for packets entering or leaving the datacenter. When there is a high volume of north-south traffic (i.e., traffic entering or exiting) generated in the datacenter, such an edge device can become a bottleneck. As such, there is a need for solutions that alleviate this bottleneck while still being able to provide edge services in a datacenter.

BRIEF SUMMARY

Some embodiments provide a novel method for handling data messages for logical networks that are implemented in a data center by having managed forwarding elements (MFEs) provide gateway service processing (e.g., firewall, DNS, etc.). In some embodiments, the MFEs receive data messages, sent from endpoints in the logical networks, that are destined for external networks. When an MFE receiving such a data message identifies that the data message requires gateway service processing before being sent to the external network, the MFE identifies a particular MFE (either the same MFE or a different MFE in the datacenter) that is assigned to provide the gateway service processing for the logical network associated with the data message. If the MFE that receives the data message is also the MFE assigned to provide gateway service processing for the logical network associated with the data message, then this MFE provides the gateway service processing and forwards the data message to a datacenter router that provides access to the external network. If a different MFE is assigned to provide gateway service processing for the logical network associated with the data message, the MFE forwards the data message to that different MFE for the different MFE to provide the gateway service processing and to forward the data message to the datacenter router that provides access to the external network.

In some embodiments, the MFEs are configured to provide the gateway service processing by a network control system (e.g., a network controller and/or network manager, or cluster of network controllers and/or managers). The network control system, in some embodiments, assigns the gateway service processing for different logical networks to different MFEs. In some embodiments, logical networks for which certain edge services (e.g., VPN or network address translation (NAT)) is required are assigned to edge nodes that provide centralized gateway service processing, instead of being assigned to the distributed MFEs. The assignment of logical networks to MFEs, in some embodiments, is a load balancing operation that takes into account the capacity of the different MFEs (and the hosts on which they execute) to handle additional processing. A single MFE may be assigned multiple logical networks for which that MFE provides gateway service processing. In some embodiments, the network control system configures the MFEs to perform the gateway service processing and to identify the MFE assigned to each logical network. The network control system provides processing rules to each MFE (e.g., firewall rules) for the logical networks assigned to the MFE and policy-based routing entries used to identify the MFE assigned to a particular logical network.

The MFEs of some embodiments execute on the same machines as endpoints of the logical networks. In some embodiments, the MFEs execute in virtualization software (e.g., a hypervisor) of a host computer. In some embodiments, when a different MFE is identified as the MFE assigned to provide gateway service processing for a logical network, the MFE that received the data message forwards the data message to the different MFE through a tunnel. These tunnels may use virtual extensible local area network (VXLAN) encapsulation, Generic Network Virtualization Encapsulation (GENEVE), or other types of encapsulation. In some embodiments, the logical networks span multiple datacenters (e.g., customer sites) that are connected so that communication between datacenters does not require network address translation (NAT), virtual private networks (VPN), or IPsec encapsulation and gateway service processes can therefore be distributed to MFEs instead of centrally provided at a dedicated edge node. This can prevent an edge node from becoming a bottleneck for north-south traffic.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

FIG. 8 conceptually illustrates a computer system with which some embodiments of the invention are implemented.

DETAILED DESCRIPTION

Figure 1:
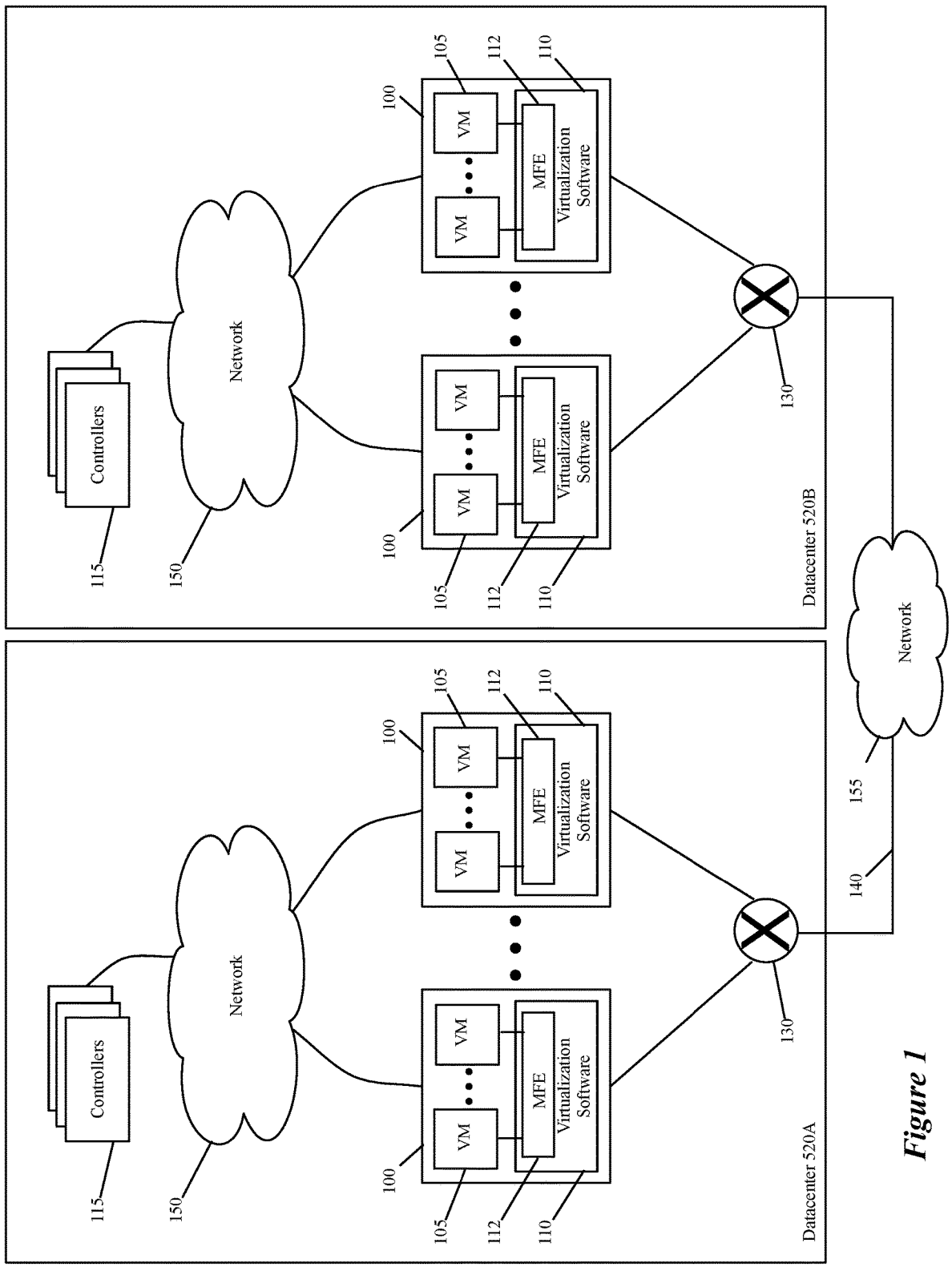
FIG. 1 illustrates an exemplary environment in which the invention is implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

As used in this document, data messages refer to a collection of bits in a particular format sent across a network. Also, as used in this document, a data flow refers to a set of data messages sharing a set of attributes (e.g. a five-tuple) even if the shared set of attributes has source and destination values switched for different directions of communication (i.e., from a first machine to a second machine and from the second machine back to the first machine). Data flows (or flows) as used in this document, in some instances, refer to one half of a communication between two machines (i.e., a flow refers, in some cases, to the communication from one machine to another machine in one direction). One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references, respectively, to the second data link layer, the third network layer, the fourth transport layer, and the seventh application layer of the OSI (Open System Interconnection) layer model.

Some embodiments provide a novel method for handling data messages for logical networks (e.g., logical switches, or sets of logical forwarding elements) that are implemented in a data center by having managed forwarding elements (MFEs) provide gateway service processing (e.g., firewall, DNS, etc.). In some embodiments, the MFEs receive data messages, sent from endpoints in the logical networks, that are destined for external networks. When an MFE receiving such a data message identifies that the data message requires gateway service processing before being sent to the external network, the MFE identifies a particular MFE (either the same MFE or a different MFE in the datacenter) that is assigned to provide the gateway service processing for the logical network associated with the data message. If the MFE that receives the data message is also the MFE assigned to provide gateway service processing for the logical network associated with the data message, then this MFE provides the gateway service processing and forwards the data message to a datacenter router that provides access to the external network. If a different MFE is assigned to provide gateway service processing for the logical network associated with the data message, the MFE forwards the data message to that different MFE for the different MFE to provide the gateway service processing and to forward the data message to the datacenter router that provides access to the external network. In some embodiments, a set of the logical networks are logical switches which are each assigned an MFE to provide gateway service processing.

FIG. 1 illustrates an exemplary environment in which the invention of some embodiments is implemented. FIG. 1 includes two datacenters 120 connected by a direct connection 140. The direct connection 140 is a connection through an external network 155 over which the edge routers 130 provided by the datacenters do not require centralized edge services such as network address translation (NAT) or IPSec encapsulation for inter-datacenter communication. A plurality of host computers 100 and a set of controller computers 115 are included in the datacenters 120 and are connected by internal networks 150. The host computers host end machines (data compute nodes (DCNs) such as virtual machines 105, containers, namespaces, etc.) and execute virtualization software 110 that includes a software forwarding element (or set of software forwarding elements) that is referred to herein as a managed forwarding element (MFE) 112. In different embodiments, the MFE on a particular host may be one software forwarding element that implements multiple logical switches and/or logical routers, or multiple separate software forwarding elements executing in the virtualization software (e.g., one or more virtual switches and/or virtual routers). In some embodiments, the virtualization software is a hypervisor on top of which the end machines execute.

The MFEs 112 are capable of communicating directly with edge router 130 to send messages to other datacenters or to the external network 155. Within each datacenter, the controller computers 115 and a set of network manager computers (not shown) control the host machines 100 to implement a set of logical networks by configuring the virtualization software 110 including the MFE 112 to perform logical processing for the logical networks. In some embodiments, the MFEs are configured to perform first-hop processing on data messages. That is, the first MFE that receives a data message from an end machine (i.e., the MFE executing on the same host computer as the source end machine of the data message) performs logical processing for all logical forwarding elements (e.g., logical switching for a source logical switch, logical routing for a logical router, and logical switching for a destination logical switch) along a logical path to a destination machine. As will be discussed below, in some embodiments this logical processing performed by the MFEs also includes gateway service processing.

In some embodiments, the MFEs are configured to provide the gateway service processing by a network control system (e.g., a network controller and/or network manager, or cluster of network controllers and/or managers). The controllers 115 in FIG. 1 represent such a network control system; it should be understood that while this figure shows controllers 115, these could be management plane applications or computers, network controller applications or computers, or combinations thereof. The network control system, in some embodiments, assigns the gateway service processing for different logical networks to different MFEs. In some embodiments, logical networks for which certain edge services (e.g., VPN or network address translation (NAT)) are required are assigned to edge nodes that provide centralized gateway service processing, instead of being assigned to the distributed MFEs. Centralized gateway service processing, in some embodiments, includes any or all of network address translation (NAT) for multiple logical networks sharing a same external IP address, multiple logical networks sharing a same virtual private network (VPN) IP address, or multiple logical networks using IPsec encapsulation before being sent to a provider edge router.

The assignment of logical networks to MFEs, in some embodiments, is a load balancing operation that takes into account the capacity of the different MFEs (and the hosts on which they execute) to handle additional processing. A single MFE may be assigned multiple logical networks for which that MFE provides gateway service processing. In some embodiments, the network control system configures the MFEs to perform the gateway service processing and to identify the MFE assigned to each logical network. The network control system provides processing rules to each MFE (e.g., firewall rules) for the logical networks assigned to the MFE and policy-based routing entries used to identify the MFE assigned to a particular logical network.

Figure 2:
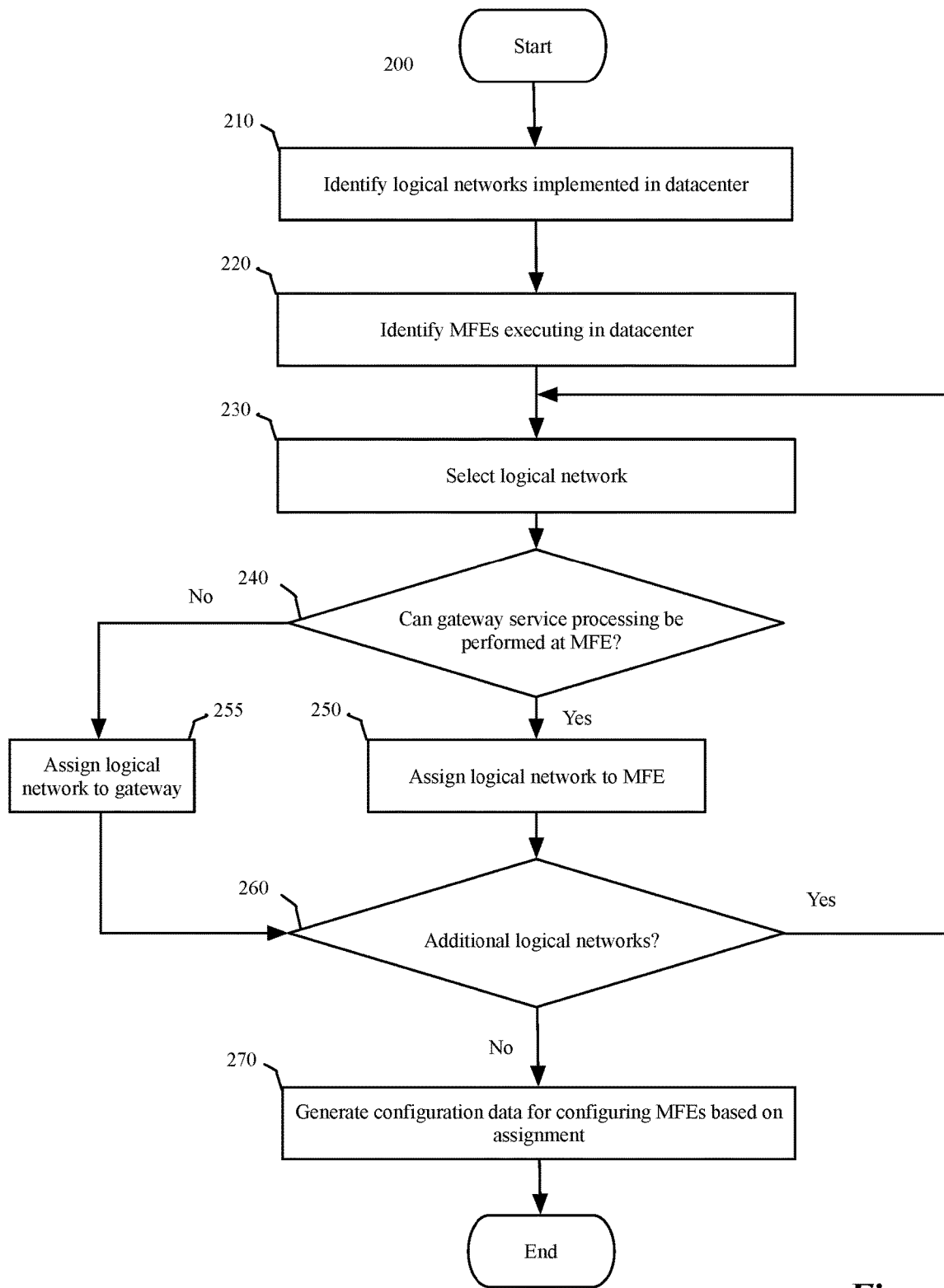
FIG. 2 conceptually illustrates a process that is performed to assign gateway service processing for different logical networks to MFEs in the datacenter.

FIG. 2 conceptually illustrates a process 200 that is performed to assign gateway service processing for different logical networks to MFEs in the datacenter. In some embodiments, the process 200 is performed by a network control system (e.g., controller computers 115). The process 200 begins by identifying (at 210) the logical networks implemented in the datacenter. In some embodiments, identifying the logical networks comprises querying a network manager. In addition to identifying the existence of the logical networks, in some embodiments the controller identifies a set of gateway services applied for each identified logical network. As mentioned above, in some embodiments each logical switch is treated as a separate logical network for the purposes of assigning gateway processing to different MFEs. That is, a single logical router might have multiple logical switches (with different logical subnets) connected. In some embodiments, each of these logical switches (i.e., logical subnets) may be assigned to a different MFE for gateway service processing.

Next, the process 200 identifies (at 220) a set of MFEs that are executing in the datacenter. The set of MFEs, in some embodiments, are MFEs that are directly connected to a provider edge router that connects the datacenter to external networks. In some embodiments, identifying the MFEs includes identifying characteristics of the MFEs that relate to the capacity of the MFE (or the host on which the MFE executes) to process north-south data messages (processing power, current load, MC speed, etc.). That is, some MFEs may not be able to process these north-south data messages because they execute on host computers that either do not have the resources to perform edge services or are not connected to a provider edge router.

After identifying (at 220) the set of MFEs, the process 200 selects (at 230) a logical network for which to assign gateway services to one of the MFEs in the identified set of MFEs executing in the datacenter (if the gateway services are eligible for assignment to such an MFE). The logical networks, in some embodiments, are identified by a logical network identifier (e.g., VLAN or VXLAN ID) or a subnet associated with the logical network.

For the selected logical network, the process 200 determines (at 240) whether the logical network requires gateway service processing that can be performed at an MFE. If gateway service processing can be performed at an MFE (i.e., does not need to be performed at an edge node), the process 200 assigns (at 250) the gateway service processing for the logical network to a particular MFE. In some embodiments, the assignment is based on a load balancing decision. The load balancing decision, in some embodiments, is a hash-based decision that determines an MFE from among the identified MFEs to which the gateway service processing for the logical network is assigned based on a hash of the logical network identifier. In some embodiments, the association between a set of hash values and particular MFEs is based on resources available to each MFE such that MFEs with more resources are associated with more hash values. In addition, some embodiments restrict the possible MFEs that are eligible to perform gateway service processing for a particular logical network to those MFEs that are already required to implement distributed aspects of that logical network (e.g., logical switches and/or distributed logical routers). Once an MFE is assigned to provide gateway service processing the process 200 proceeds to determine (at 260) whether there are additional logical networks to assign to MFEs.

On the other hand, if the process 200 determines (at 240) that the logical network requires gateway service processing that cannot be performed at an MFE, the process 200 assigns (at 255) the gateway processing for the logical network to an edge node that provides gateway service processing for logical networks that cannot have gateway service processing distributed to the MFEs. In certain cases, multiple logical networks need to have all of their north-south traffic processed at the same ingress/egress point, and thus these networks are assigned to an edge node. For instance, if multiple logical networks share the same NAT IP address or use the same VPN IP address, then the gateway service processing for the flows belonging to these networks are assigned to an edge node rather than being balanced across multiple MFEs in some embodiments. For instance, two or more logical switches that are attached to the same logical router might have different logical subnets but share the same VPN IP for external traffic.

After assigning (at either 250 or 255) the gateway service processing to either an MFE or gateway device, the process 200 proceeds to determine (at 260) whether there are additional logical networks to assign to MFEs. If the process 200 determines (at 260) that there are additional logical networks to assign to MFEs, the process 200 selects (at 230) a next logical network for which to assign gateway service processing to an MFE in the set of MFEs.

After all logical networks for which gateway service processing can be provided by the MFEs have been assigned to an MFE, the process 200 generates (at 270) configuration data for configuring the MFEs to implement the assigned gateway service processing and sends the configuration data to the host computers on which the MFEs execute. In some embodiments, separate configuration data is generated for each MFE. The configuration data, in some embodiments, includes a set of policy based routing rules that cause MFEs to forward data messages to the MFEs assigned to process data messages for a logical network associated with the data messages. In some embodiments, a host (e.g., an MFE on the host) is configured to implement a distributed router and an edge services gateway port that are discussed in more detail in relation to FIG. 7.

In some embodiments, the policy based routing rules specify routes for data messages for a logical network based on at least one of a logical network identifier (e.g., VLAN or VXLAN tag), a set of IP addresses (e.g., an IP subnet) associated with the logical network, and a set of MAC addresses associated with the logical network. In some embodiments, the configuration data includes a set of associations between particular logical networks and particular MFEs assigned to provide gateway service processing for the logical networks. The set of associations may use any combination of logical network identifiers, IP addresses (e.g., subnets), and MAC addresses. For example, in some embodiments, a set of policy-based routing rules (e.g., src 192.168.1.0/24, dst 0/0→HYP1_VTEP; src 192.168.2.0/24, dst 0/0→HYP2_VTEP) is configured in an edge services gateway port on a distributed router to which outgoing data messages are forwarded. In some embodiments, the associations are embedded in a set of routing entries used to configure the MFE.

The configuration data for a particular MFE, in some embodiments, also includes data for implementing the gateway service processing for the logical networks assigned to the particular MFE. In some embodiments, each MFE receives data (e.g., service rules) for implementing the gateway service processing for all the logical networks. In some embodiments, the gateway service processing includes a logical firewall for a particular logical network and the configuration data includes a set of firewall rules for the particular logical network. A single MFE, in some embodiments, may be assigned multiple logical networks for which it provides gateway service processing. In some embodiments, different gateway service services are provided for different logical networks at the same MFE. For example, a first logical network may require a logical firewall while a second logical network requires DNS services and the configuration data for each service is provided to the MFE.

Configuration data, in some embodiments, is sent to a controller proxy module on a host computer that interacts with the network control system (e.g., a set of controller and/or manager computers) to configure other modules on the host computer to implement the configuration data sent from the network control system. In some embodiments, the host configures the MFE to implement the configuration data by creating entries in a routing table or policy based routing rule set based on the configuration data received from the network control system. The host computer also configures the MFEs, in some embodiments, with the gateway service processing rules or information for the logical networks assigned to the MFE to provide gateway service processing. In some embodiments, process 200 is performed initially, and operations 220, 230, 240, 250 or 255, and 270 are performed on the creation (or implementation) of a new logical network in the datacenter. Additionally, if an MFE assigned to perform gateway service processing for a set of logical networks is removed from the network, operations 220, 230, and 250-270 are performed to reassign the gateway service processing for the set of logical networks among the remaining MFEs. If a new MFE is added to the network, some embodiments reassign the logical networks to include the new MFE. Other embodiments wait until new logical networks are created to include the new MFE in the gateway processing assignment.

Figure 3:
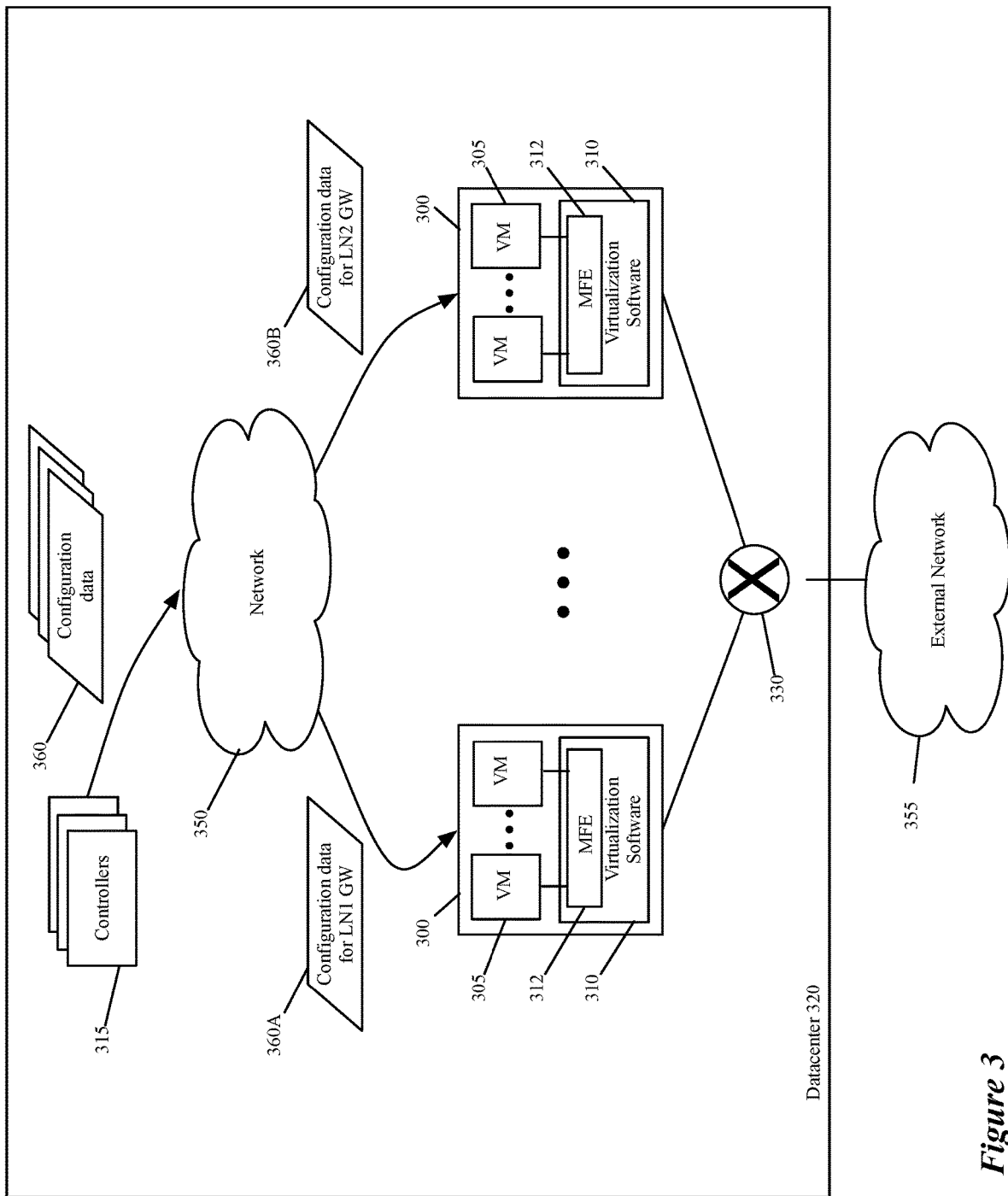
FIG. 3 illustrates a set of controllers sending configuration data to hosts in a datacenter.

FIG. 3 illustrates a set of controllers sending configuration data to hosts in a datacenter. FIG. 3 illustrates a set of controllers 315 and a set of host computers 300 in a datacenter 320. The host computers 300 execute VMs 305 and virtualization software 310 including MFE 312. As discussed above, the set of controllers generates sets of configuration data 360 according to process 200. The sets of configuration data 360, in some embodiments, include a separate set of configuration data 360 for each of a set of hosts 300 in the datacenter 320.

FIG. 3 illustrates that different sets of configuration data 360A and 360B are sent to different hosts to configure the different MFEs to provide gateway service processing for different logical networks (e.g., logical networks 1 and 2 (LN1 and LN2) respectively). In some embodiments, the different sets of configuration data 360 also include configuration data that is common to all (or many) of the MFEs that is used to forward data messages for different logical networks. This common configuration data can include data specifying MFEs assigned to provide gateway service processing for each logical network, which is provided to each MFE that performs processing for that logical network. The common configuration data, in some embodiments, are a set of forwarding rules or policy-based rules that are used to identify the MFE assigned to provide gateway service processing for a particular logical network. In some embodiments, the forwarding configuration data is sent separately from the specific configuration data (e.g., 360A and 360B) for configuring the MFE to provide the gateway service processing to logical networks assigned to the MFE.

The separate sets of configuration data, in some embodiments, include a set of policy based routing rules identifying MFEs/hosts associated with each logical network. In some embodiments, the policy based routing rules specify at least one of a logical network identifier (e.g., VLAN or VXLAN tag), a set of IP addresses (e.g., an IP subnet) associated with the logical network, and a set of MAC addresses associated with the logical network. In general, a policy-based routing rule can be based on any information contained in a header field of a received data message. In some embodiments, the configuration data includes a set of associations between particular logical networks and particular MFEs assigned to provide gateway service processing for the logical networks. The set of associations, in some embodiments, use any combination of logical network identifiers, IP addresses (e.g., subnets), and MAC addresses. For example, in some embodiments, a set of policy-based routing rules (e.g., src 192.168.1.0/24, dst 0/0→HYP1_VTEP; src 192.168.2.0/24, dst 0/0→HYP2_VTEP) is configured in an edge services gateway port on a distributed router to which outgoing data messages are forwarded. In some embodiments, the associations are embedded in a set of routing entries used to configure the MFE.

The configuration data for a particular MFE, in some embodiments, also includes data for implementing the gateway service processing for the logical networks assigned to the particular MFE. In some embodiments, the gateway service processing includes a set of gateway service processing (e.g., a logical firewall or domain name service) for a particular logical network and the configuration data includes a set of configuration data for implementing the set of services for the particular logical network. A single MFE, in some embodiments, is assigned multiple logical networks for which it provides gateway service processing. In some embodiments, different gateway services are provided for different logical networks at the same MFE. For example, a first logical network may require a logical firewall while a second logical network requires DNS services and the configuration data for each service is provided to the MFE.

In some embodiments, the configuration data specifies an edge services gateway port of a distributed logical router implemented by each MFE (or the virtualization software). When a first end machine port associated with a logical network is instantiated on a host computer in some embodiments, a policy (e.g., a policy based routing rule) is created (or configured) on the edge service gateway port that applies to traffic from the logical network. For example, a policy might be created that applies to a source subnet (e.g., 192.168.1.0/24) that is associated with the logical network and for a set of destination addresses (e.g., src 192.168.1.0/24, dst 0/0 →MFE_VTEP) that specifies forwarding the data message to, for example, the VXLAN tunnel endpoint (VTEP) IP address (MFE_VTEP) associated with the MFE assigned for the logical network. On an MFE that provides the gateway service processing for the logical network, the MFE is configured with a policy-based routing rule in some embodiments (e.g., src 192.168.1.0/24, dst 0/0 →apply egress firewall→PR) to provide the gateway service processing and to forward data messages with a source address in a subnet associated with the logical network to a provider edge router (at an IP address 'PR'). A route for traffic entering the network at the MFE, in some embodiments, is specified for the traffic destined for the subnet associated with the logical network and specifies an action and a destination port (e.g., src 0/0, dst 192.168.1.0/24 →apply ingress firewall→DLR), such that an incoming data message has the ingress firewall rules applied and is then forwarded to a distributed logical router port (DLR) for east-west processing. In some embodiments, these policy-based rules or routing entries are used in implementing a distributed logical router and the MFE assigned to provide the gateway service processing is identified by a VXLAN tunnel endpoint (VTEP) IP address to which the data message should be tunneled. Distributed logical routers are described in more detail in United States Patent Publication No. 2016/0226700, which is hereby incorporated by reference. By configuring each MFE with routes (or policy-based routing rules) for data messages of the different logical networks, an MFE on a host computer to which an end machine migrates does not require new configuration specific to the migrated machine.

As mentioned, the MFEs use this configuration data to process data messages sent to and from the logical network endpoints in the datacenter. When an MFE receives a data message from a logical network endpoint, that MFE (i) determines whether the data message requires gateway processing and, if so, (ii) determines whether to perform gateway processing locally or send the data message to another MFE (or edge node) for the gateway processing, depending on where the gateway service processing is performed for the particular logical network with which the data message is associated.

Figure 4:
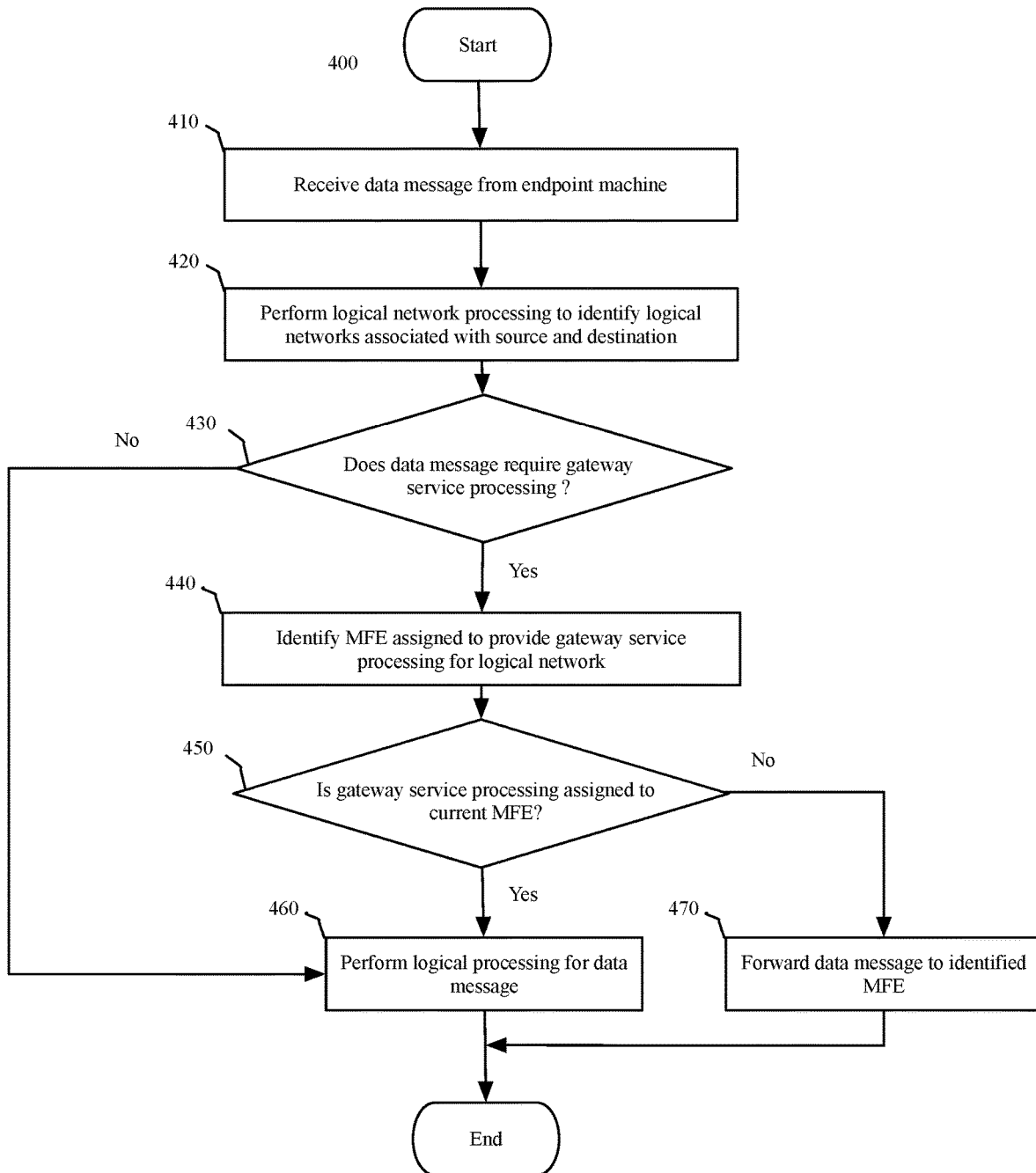
FIG. 4 conceptually illustrates a process for processing a data message.

FIG. 4 conceptually illustrates a process 400 for processing a data message. In some embodiments, the process 400 is performed by an MFE executing on a host computer. The host computer, in some embodiments, executes a virtualization software in which the MFE executes as well as endpoint machines that are the source of data messages received by the MFE executing on the host computer. As described above, the MFE on a particular host may be one software forwarding element that implements multiple logical switches and/or logical routers, or multiple separate software forwarding elements executing in the virtualization software (e.g., one or more virtual switches and/or virtual routers).

The process 400 begins by receiving (at 410) a data message from an endpoint machine. Some data messages requiring gateway service processing are destined for a machine in an external network while others are destined for a machine in a local network. In some cases, only north-south traffic (i.e., traffic entering or exiting the datacenter) requires gateway service processing, while in other embodiments some or all east-west traffic also requires such gateway service processing. The external network, in some embodiments, is reached through a provider edge router that connects to the external network.

After receiving the data message, the process 400 performs (at 420) logical network processing to identify (at 420) the logical networks associated with the source and destination of the received data message. The identification, in some embodiments, is based on a logical network identifier (e.g., a VLAN or VXLAN ID), while in other embodiments, the identification is based on a source and destination IP address of the data message (e.g., an IP subnet to which the IP addresses belongs). In yet other embodiments, a logical network is identified based on a MAC address or the port of the MFE through which the data message is received. In some embodiments, a source IP address is in a IP subnet that is used in a policy-based routing rule for the logical network (src 192.168.2.0/24, dst 0/0→egress port).

The process 400 determines (at 430) whether the data message requires gateway service processing. In some embodiments, determining that the data message requires gateway service processing is done implicitly based on the inclusion of the gateway service processing in a processing pipeline (e.g., a logical processing pipeline) of a logical forwarding element (e.g., a logical router) associated with the logical network. Determining that the data message requires gateway service processing, in some embodiments, is implicit in identifying (at 440) an MFE to which gateway service processing for the logical network has been assigned. In some embodiments, the MFE is identified by a destination address (e.g., a VTEP IP address associated with the MFE) specified in a policy-based routing rule as discussed above. If the process 400 determines (at 430) that the data message does not require gateway service processing (e.g., there is no gateway service processing associated with a logical network to which the data message belongs, or the data message is not of a type that requires gateway service processing), the process performs (at 460) the logical processing for the data message and forwards the data message to the destination (e.g., through the provider edge router if the destination is external or to another MFE at another host computer in the datacenter at which the destination is located if the destination is another logical network endpoint in the datacenter), and the process ends. In some embodiments, determining that no gateway service processing is associated with the logical network is implicit in the lack of a policy-based routing rule that applies to the logical network.

If the process 400 determines (at 430) that the data message requires gateway service processing, the process 400 then identifies (at 440) the MFE assigned to provide gateway service processing to the logical network identified (at 420). In some embodiments, the identification of the MFE is based on a policy-based routing rule that is based on the configuration data received from the set of controller computers as discussed above. In other embodiments, rather than use policy-based routing, some embodiments identify the MFE based on a table or other data structure that identifies a correspondence between a logical network identifier and an MFE that is assigned to perform gateway service processing for the logical network. In some embodiments, the MFE identified (at 440) as assigned to provide gateway service processing is an edge node that provides centralized gateway service processing for a set of logical networks in the datacenter (e.g., a set of logical switches that are behind a single VPN or NAT IP).

After identifying (at 440) the MFE assigned to provide gateway service processing to the logical network identified (at 420), the process determines (at 450) whether the MFE performing the process 400 ("the current MFE") is the MFE assigned to provide gateway service processing to the logical network. If the current MFE is assigned to provide gateway service processing, the process performs (at 460) the logical processing for the data message. In some embodiments, the logical processing includes logical L2 and L3 switching and routing operations as well as the gateway service processing for the logical network. In some embodiments, the determination of whether the current MFE is the MFE assigned to provide gateway service processing to the logical network is implicit in identifying the current MFE's address as a next hop at an edge gateway services port of the current MFE using a routing entry or policy-based routing rule of the edge services gateway port.

On the other hand, if the current MFE is not the MFE assigned to provide gateway service processing to the logical network, the process 400 forwards (at 470) the data message to the MFE identified as being assigned to provide gateway service processing to the logical network identified (at 420) as being associated with the data message and the process ends. In some embodiments, the MFE to which the data message is forwarded provides the gateway service processing for the data message and forwards the data message to the provider edge router. One of ordinary skill in the art will appreciate that the operations of process 400 are performed, in some embodiments, in a slightly different order or that some operations are combined into a single operation (e.g., examining a policy-based routing rule may identify an MFE responsible for providing gateway service processing, which implicitly determines that gateway service processing is required for the data message).

The MFEs of some embodiments execute on the same machines as endpoints of the logical networks, as shown above in FIG. 1. In some embodiments, the MFEs execute in virtualization software (e.g., a hypervisor) of a host computer. In some embodiments, the logical networks span multiple datacenters (e.g., customer sites) that are connected so that communications between datacenters does not require network address translation (NAT), virtual private networks (VPN), or IPsec encapsulation before being sent to a provider edge router and gateway service processes can therefore be distributed to MFEs instead of centrally provided at a dedicated edge node.

Figure 5A:
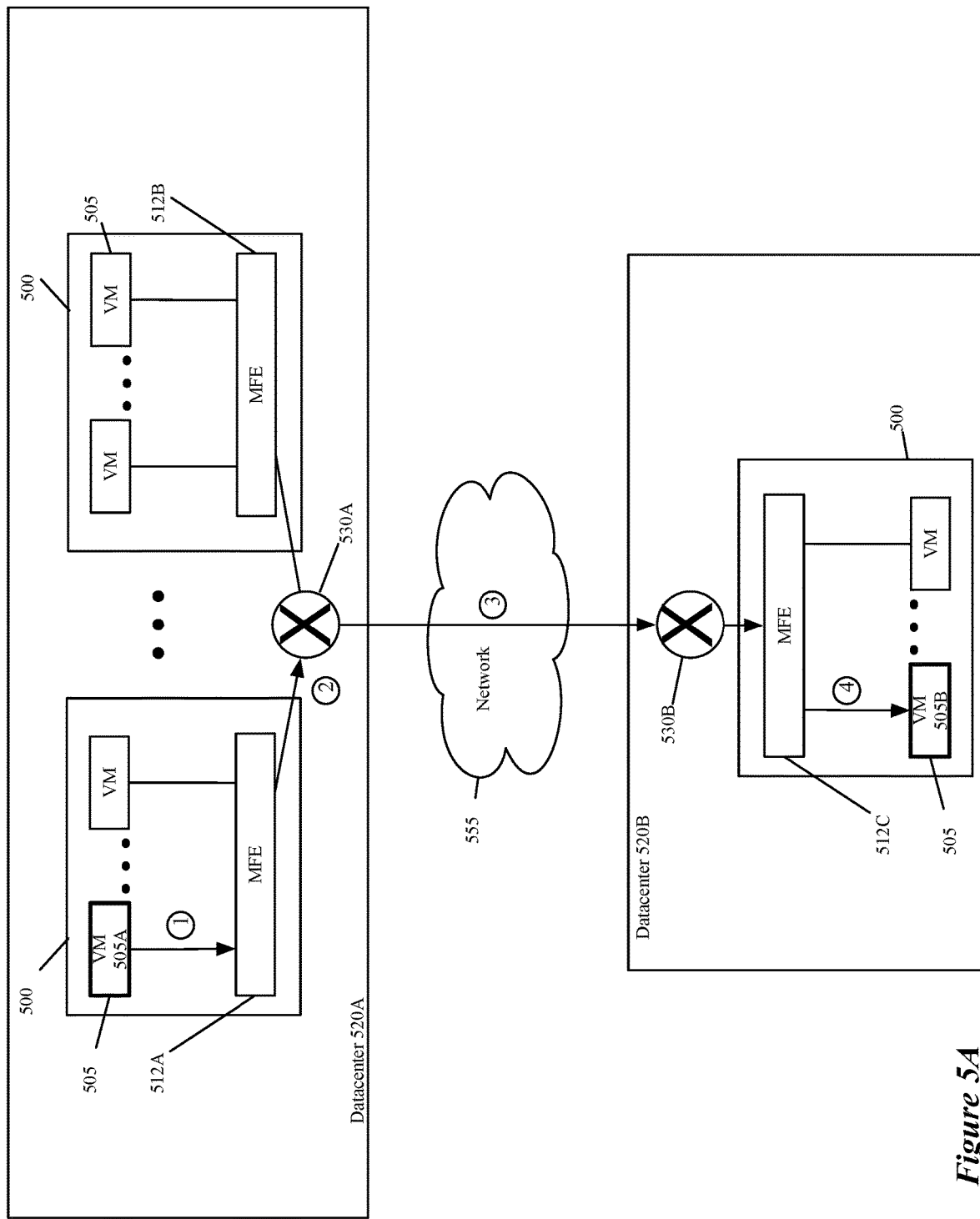
FIGS. 5A-B illustrate data messages that receive gateway service processing at an MFE executing on the same host computer as the source of a first data message and destination of a return data message.
Figure 5B:
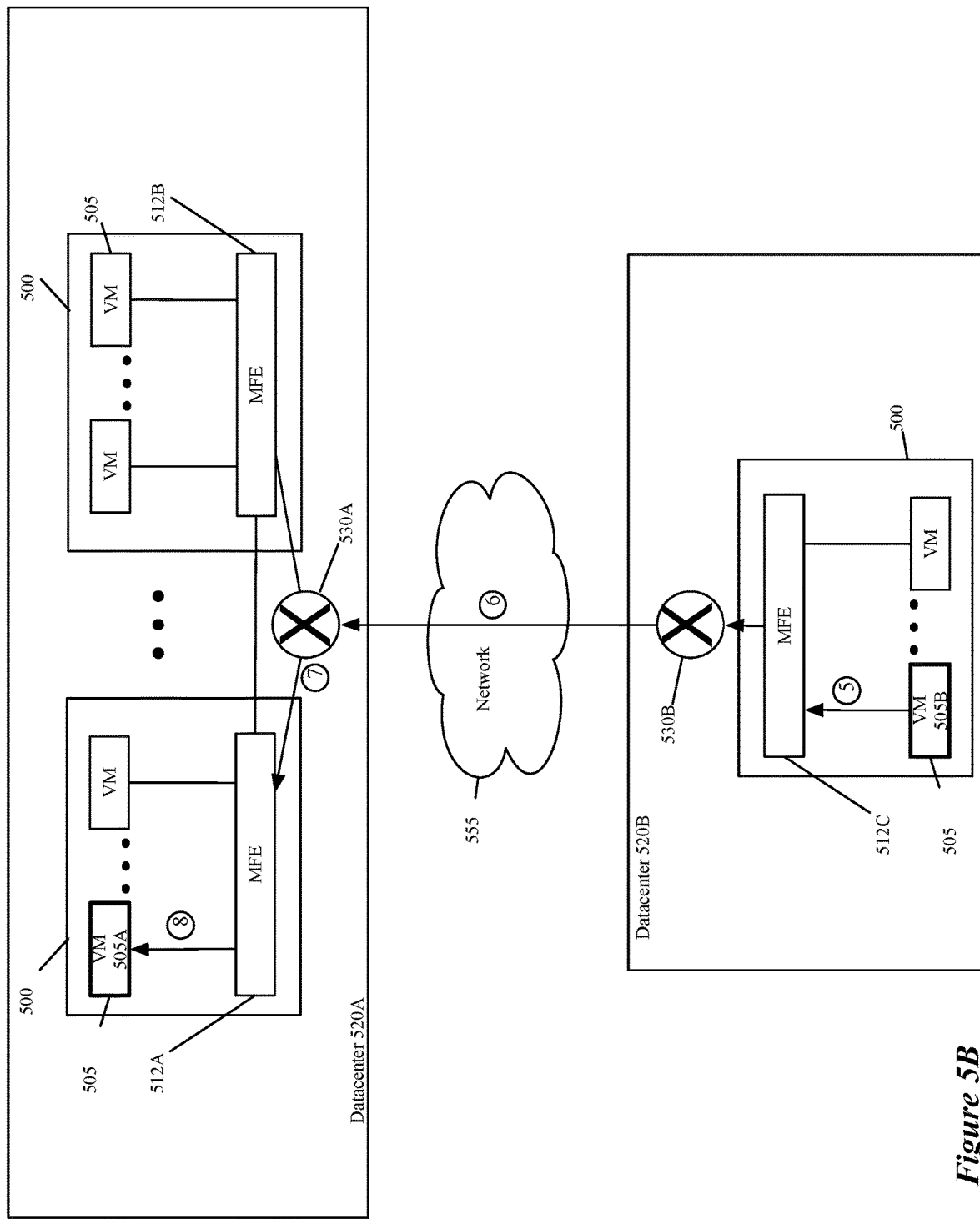

FIGS. 5A-B illustrate data messages that receive gateway service processing at an MFE executing on the same host computer as the source of a first data message and destination of a return data message. FIGS. 5A-B include datacenters 520A and 520B connected by provider edge routers 530A and 530B through external network 555. Each datacenter includes multiple hosts 500 (though only one host is shown in datacenter 520B) that each execute a set of end machines (e.g., VMs 505) and an MFE 512 (which may execute within virtualization software of the host).

FIG. 5A illustrates a first data message being sent from VM 505A in a first datacenter to VM 505B in a different datacenter (and in a different logical network). The data message marked as "1" is a first data message from VM 505A destined for VM 505B in datacenter 520B (e.g., having a destination IP address of VM 505B or of a virtual IP address that corresponds to VM 505B). The data message "1" is received at the MFE 512A which is assigned to provide gateway service processing for the logical network to which VM 505A belongs. MFE 512A processes the data message (e.g., in accordance with process 400), performs gateway service processing on the data message, and provides the data message to provider edge router 530A as data message "2". The provider edge router 530A in datacenter 520A provides the data message to the provider edge router 530B in datacenter 520B through network 555 as data message "3". Provider edge router 530B of datacenter 520B provides the data message to the MFE 512C executing on the same host computer as the destination VM 505B which in turn provides the data message to the VM 505B as data message "4".

FIG. 5B illustrates a return data message sent from VM505B back to VM 505A. The data message sent from VM 505B retraces the forward path such that data message "5" is sent from VM 505B to the MFE 512C executing on the same host as VM 505B. The MFE forwards the data message to the provider edge router 530B in datacenter 520B which forwards the data message to provider edge router 530A in datacenter 520A through network 555 as data message "6". It should be noted that, depending on how the datacenter 520B is configured, the data message may not be sent directly between the provider router 530B and the MFE 512C executing on the same host as VM 505B. For instance, these data messages might be sent through a gateway or set of forwarding elements. Upon reaching the provider edge router 530A in the datacenter 520A, that provider edge router 530A provides the data message to the MFE 512A from which it received data message "2" as data message "7". The MFE 512A in turn processes the data message and forwards it to VM 505A as data message "8". As all flows related to a particular logical network are processed by the same MFE, the gateway service processing may include stateful services that require the MFE (or host) to maintain state information regarding the data messages processed.

In some embodiments, when a different MFE is identified as the MFE assigned to provide gateway service processing for a logical network, the MFE that received the data message forwards the data message to the different MFE through a tunnel. In various embodiments, the tunnels use VXLAN, GENEVE, STT, or other encapsulation protocols.

Figure 6A:
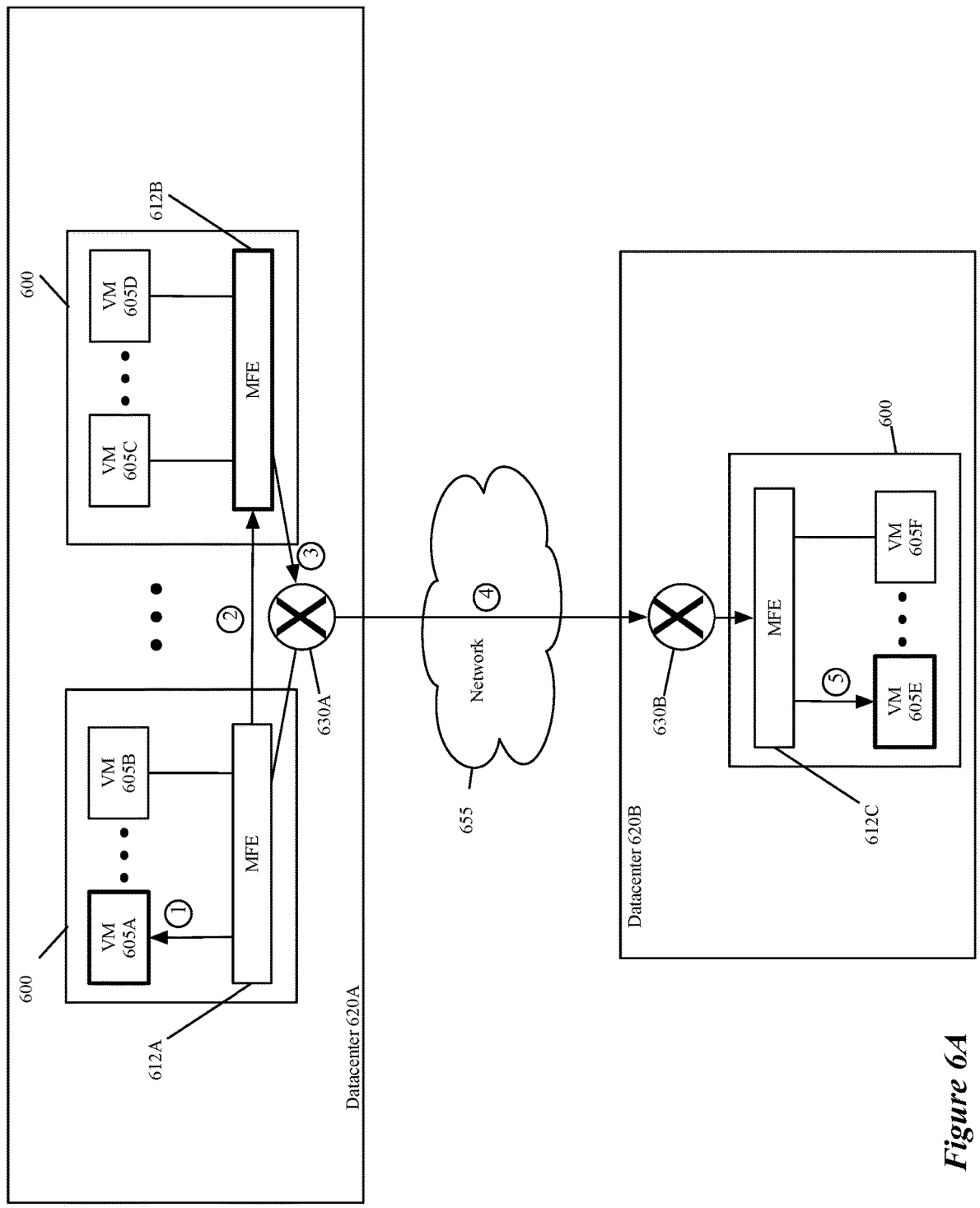
FIG. 6A-B illustrate data messages that receive gateway service processing at an MFE executing on a different host computer than the source of a first data message and destination of a return data message.
Figure 6B:
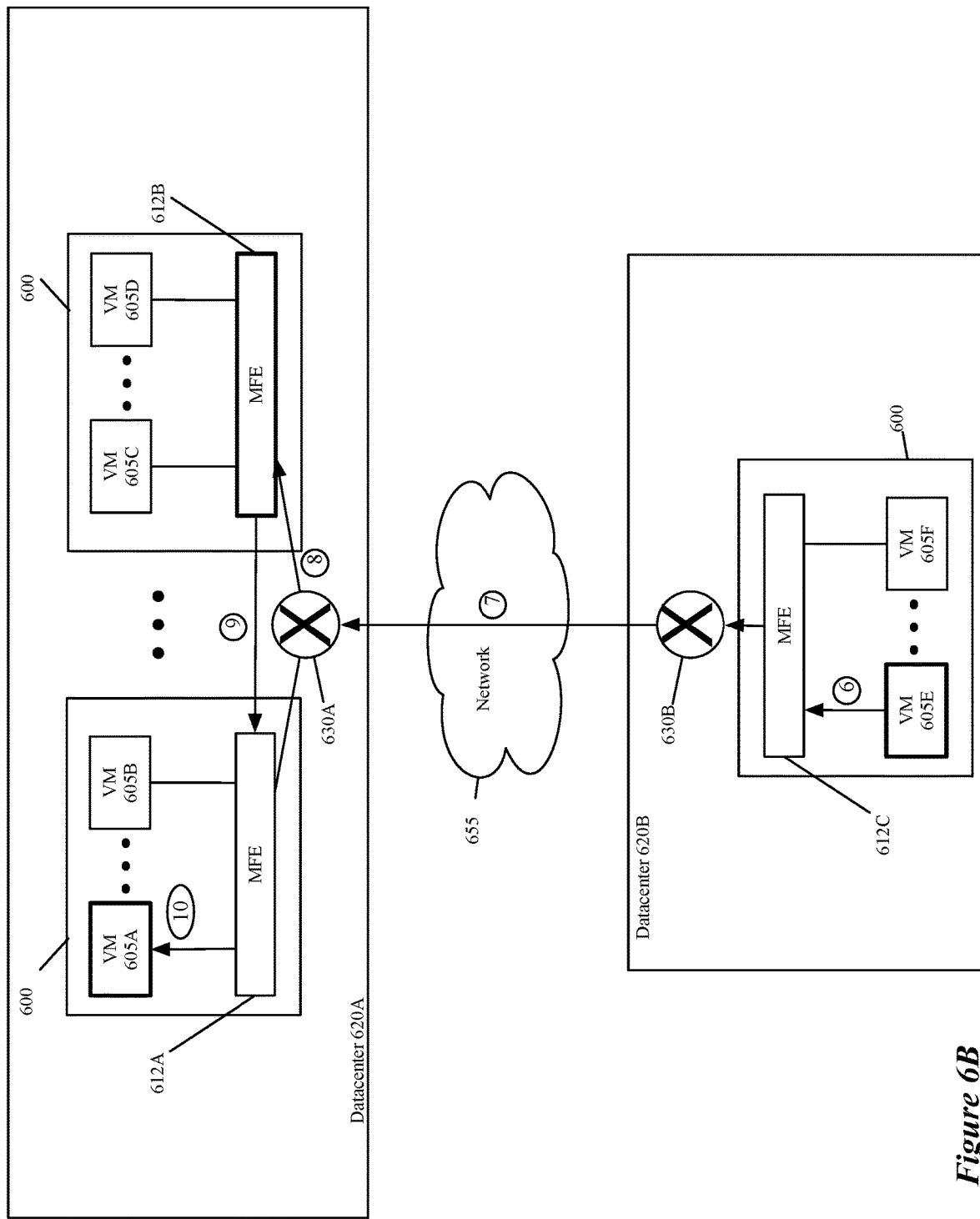

FIG. 6A-B data messages that receive gateway service processing at an MFE executing on a different host computer than the source of a first data message and destination of a return data message. FIGS. 6A-B include datacenters 620A and 620B connected by provider edge routers 630A and 630B through external network 655. Each datacenter includes multiple hosts 600 (not shown in datacenter 620B) that each execute a set of end machines (e.g., VMs, 605) and an MFE 612 (virtualization software executing the MFE not shown).

FIG. 6A illustrates a first data message being sent from VM 605A in a first datacenter to VM 605E in a different datacenter (and in a different logical network). The data message marked as "1" is a first data message from VM 605A destined for VM 605E in datacenter 620B (e.g., having a destination IP address of VM 605E or of a virtual IP address that corresponds to VM 605E). The data message "1" is received at the MFE 612A which is not assigned to provide gateway service processing for the logical network to which VM 605A belongs. This MFE 612A performs logical processing and determines that MFE 612B is assigned to provide gateway service processing for the logical network to which VM 605A belongs, and thus forwards the data message to MFE 612B as data message "2" based on process 400 (e.g., by tunneling the data message to MFE 612B). The MFE 612B processes the data message to provide gateway service processing in accordance with the configuration data for the logical network, and then provides the data message to provider edge router 630A as data message "2". The MFE 612B provides the data message to the provider edge router 630A in datacenter 620A as data message "3". The provider edge router 630A in datacenter 620A routes the data message to the provider edge router 630B in datacenter 620B through network 655 as data message "4". Provider edge router 630B of datacenter 620B routes the data message to the MFE 612C executing on the same host computer as the destination VM 605E which in turn provides the data message to the VM 605E as data message "5". It should be noted that, depending on how the datacenter 620B is configured, the data message may not be sent directly between the provider router 630B and the MFE 612C executing on the same host as VM 605E. For instance, these data messages might be sent through a gateway or set of forwarding elements.

FIG. 6B illustrates a return data message sent from VM605E back to VM 605A. The data message sent from VM 605E retraces the forward path such that data message "6" is sent from VM 605E to the MFE 612C executing on the same host as VM 605E. The MFE forwards the data message to the provider edge router 630B in datacenter 620B, which routes the data message to provider edge router 630A in datacenter 620A through network 655 as data message "7". The provider edge router 630A routes the data message to the MFE 612B from which it received data message "3" as data message "8". The MFE 612B in turn performs ingress gateway service processing on the data message and forwards the data message to MFE 612A as data message "9" (e.g., by encapsulating the data message). Finally, the MFE 612A forwards the data message to VM 605A as data message "10".

As described above, in some embodiments, the logical networks include a distributed logical router that is implemented by each MFE (or each MFE hosting a machine connected to the logical network) and a centralized (service) logical router with gateway services configured that is implemented at a particular host computer (e.g., by a particular MFE). Distributed and centralized logical routers are described in more detail in United States Patent Publication No. 2016/0226700, which is hereby incorporated by reference. The MFEs, in some embodiments are also configured with an edge services gateway port that is used as a destination port for traffic destined to external networks and that initiates the performance of certain operations identified in process 400 described above.

Figure 7:
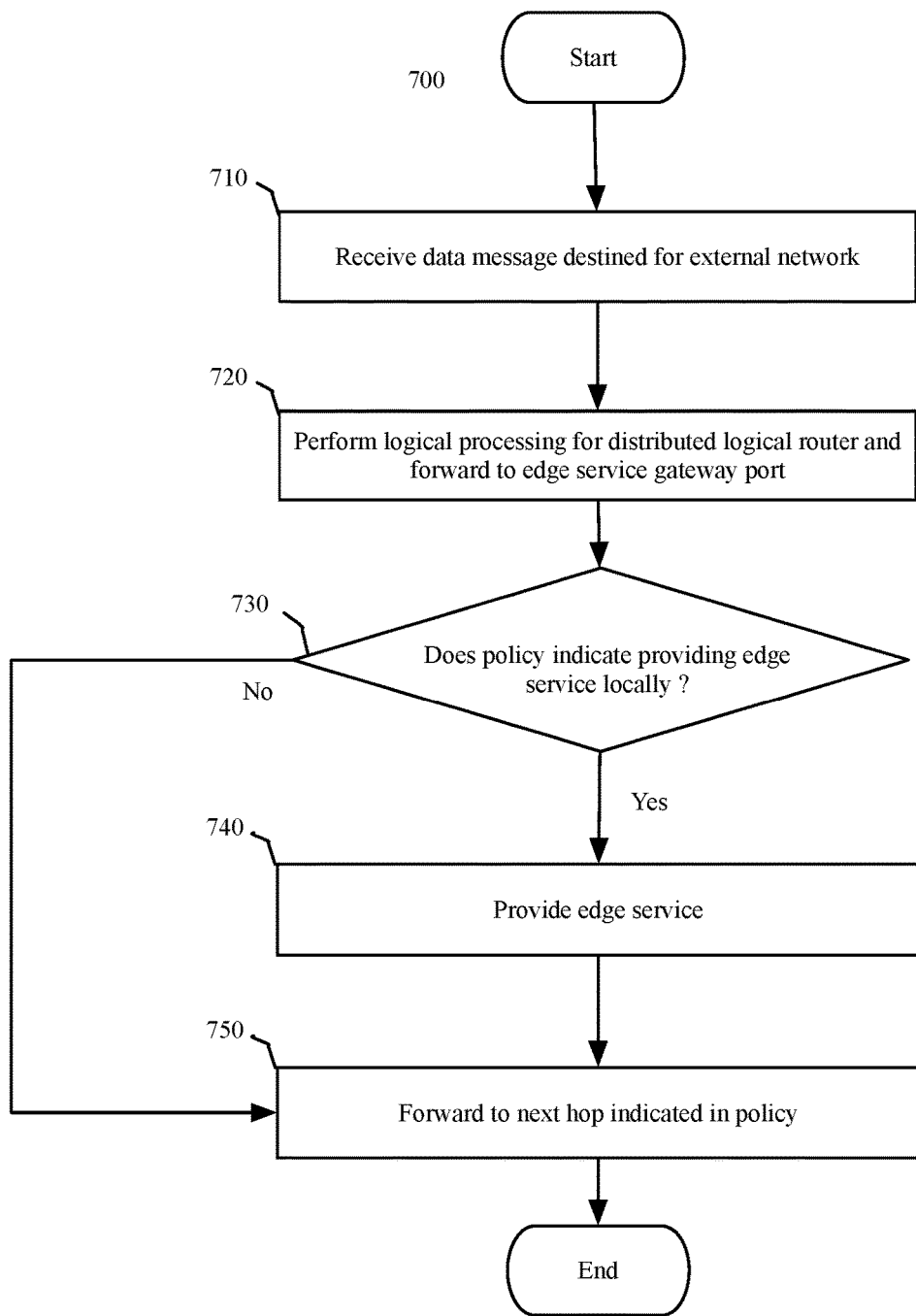
FIG. 7 illustrates a process for processing a data message destined for an external network through a distributed logical router and an edge services gateway port.

FIG. 7 illustrates a process 700 for processing a data message destined for an external network through a distributed logical router and an edge services gateway port. In some embodiments, the set of data messages described in relation to FIGS. 5 and 6 are the result of the set of logical processing operations described in process 700. In some embodiments, the process 700 is performed by each MFE in the datapath of the data message (in some embodiments, the MFEs on the datapath only include a first hop MFE and the assigned MFE for the logical network, which could be the first hop MFE).

The process 700 begins by receiving (at 710) a data message destined for an external network. The data message is received, in some embodiments, at a distributed logical router port from a logical switch to which the source of the data message sends the data message. If the MFE is a first-hop MFE executing on the same host computer as the source of the data message, the data message is received from its source (i.e., a logical network endpoint). If the MFE is an MFE that is assigned to provide a gateway edge service for the logical network from which the data message is sent, the data message is received from an MFE executing on a separate host machine on which the source of the data message executes, in some embodiments. In this case, that MFE would have performed logical router processing to identify that the data message requires gateway services processing and tunneled the data message to the assigned MFE for the logical network.

After receiving (at 710) the data message, the process 700 performs (at 720) logical processing for a distributed logical router that includes identifying an egress logical interface of the distributed router for the data message. As described above, the MFEs are configured to send data messages destined for external networks to an edge services gateway port configured on each MFE. As part of the processing at the edge services gateway port, the MFE determines (at 730) whether the MFE is the assigned MFE. In some embodiments, the determination is based on a policy-based routing rule as described above that specifies that, for the IP subnet to which the source IP address belongs, the MFE 15 (1) to provide (at 740) gateway service processing (e.g., FW, etc.) and forward (at 750) the data message to the next hop which, in this case would be the provider edge router or (2) to forward to the next hop MFE that is assigned to provide the gateway service processing.

If the process 700 determines (at 730) that the MFE is the assigned MFE it provides (at 740) gateway service processing (e.g., FW, etc.) and forwards (at 750) the data message to the next hop, which in this case would be the provider edge router and the process 700 ends. If the process 700 determines (at 730) that the MFE is not the assigned MFE it forwards (at 750) the data message to the next hop, which in this case would be the assigned MFE for the logical network and the process 700 ends. In some embodiments, providing the data message to the next hop includes encapsulating the data message. The encapsulation, in some embodiments, identifies a tunnel endpoint associated with the host computer on which the MFE assigned for the logical network executes. The MFE assigned to provide the gateway service processing would then perform process 700 to provide the gateway services and forward the data message to the provider edge router on the path to the destination in the external network.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 8 conceptually illustrates a computer system 800 with which some embodiments of the invention are implemented. The computer system 800 can be used to implement any of the above-described hosts, controllers, and managers. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of configuring gateway service processing for a plurality of logical networks implemented in a datacenter, the method comprising:
    at a controller computer in the datacenter:
        for a set of logical networks implemented in the datacenter and for which gateway service processing is configured, determining whether the configured gateway service processing requires assignment to edge nodes of the datacenter;
        identifying at least two different logical networks for which the configured gateway service processing does not require assignment to the edge nodes;
        identifying managed forwarding elements (MFEs) in the datacenter designated for handling gateway service processing, wherein each respective identified MFE executes on a respective host computer to process logical network data traffic for data compute nodes (DCNs) also executing on the respective host computer; and
        for each of the identified logical networks, assigning the gateway service processing for the logical network to one of the identified MFEs, wherein a first MFE assigned for a first logical network executes on a different host computer than a second MFE assigned for a second logical network.

2. The method of claim 1, wherein the datacenter comprises a plurality of MFEs including (i) the identified MFEs and (ii) additional MFEs, the method further comprising:
    generating configuration data for configuring the plurality of MFEs to identify a respective MFE assigned to provide the gateway service processing for respective data messages; and providing the configuration data to a plurality of host computers on which the plurality of MFEs execute to configure the MFEs.

3. The method of claim 2, wherein the configuration data for a particular MFE comprises data for configuring the particular MFE to send a received data message to the MFE assigned to provide the gateway service processing for the data message using a tunnel.

4. The method of claim 2, wherein the configuration data for the first MFE comprises data for implementing the gateway service processing for the first logical network.

5. The method of claim 2, wherein the configuration data for a particular MFE comprises a set of policy-based routing rules used by the particular MFE to identify, for a data message received by the particular MFE, the MFE assigned to provide gateway service processing for the data message.

6. The method of claim 5, wherein a particular policy-based routing rule specifies a source subnet that is associated with a particular logical network.

7. The method of claim 6, wherein the one particular policy-based routing rule specifies the MFE assigned to provide gateway service processing for the particular logical network.

8. The method of claim 1, wherein the assignment of the gateway service processing for the identified logical networks is based on a load balancing operation.

9. The method of claim 8, wherein the load balancing operation is based on a capacity of each of the identified MFEs.

10. The method of claim 1, wherein at least one MFE is assigned to provide gateway service processing for multiple logical networks.

11. The method of claim 1, wherein the gateway service processing is firewall processing.

12. The method of claim 1, wherein the gateway service processing is a stateful service.

13. A non-transitory machine readable medium storing a controller program for execution by a set of processing units of a controller computer in a datacenter, the controller program for configuring gateway service processing for a plurality of logical networks implemented in the datacenter, the controller program comprising sets of instructions for:
  for a set of logical networks implemented in the datacenter and for which gateway service processing is configured, determining whether the configured gateway service processing requires assignment to edge nodes of the datacenter;
  identifying at least two different logical networks for which the configured gateway service processing does not require assignment to the edge nodes;
  identifying managed forwarding elements (MFEs) in the datacenter designated for handling gateway service processing, wherein each respective identified MFE executes on a respective host computer to process logical network data traffic for data compute nodes (DCNs) also executing on the respective host computer; and
  for each of the identified logical networks, assigning the gateway service processing for the logical network to one of the identified MFEs, wherein a first MFE assigned for a first logical networks executes on a different host computer than a second MFE assigned for a second logical network.

14. The non-transitory machine readable medium of claim 13 wherein the datacenter comprises a plurality of MFEs including (i) the identified MFEs and (ii) additional MFEs, the controller program further comprising sets of instructions for:
  generating configuration data for configuring the plurality of MFEs to identify a respective MFE assigned to provide the gateway service processing for respective data messages; and
  providing the configuration data to a plurality of host computers on which the plurality of MFEs execute to configure the MFEs.

15. The non-transitory machine readable medium of claim 14, wherein the configuration data for a particular MFE comprises a set of policy-based routing rules used by the particular MFE to identify, for a data message received by the particular MFE, the MFE assigned to provide gateway service processing for the data message.

16. The non-transitory machine readable medium of claim 15, wherein a particular policy-based routing rule specifies a source subnet that is associated with a particular logical network.

17. The non-transitory machine readable medium of claim 16, wherein the particular policy-based routing rule specifies the MFE assigned to provide gateway service processing for the particular logical network.

18. The non-transitory machine readable medium of claim 13, wherein the assignment of the gateway service processing for the identified logical networks is based on a load balancing operation that takes into account a capacity of each of the identified MFEs.

19. The non-transitory machine readable medium of claim 13, wherein at least one MFE is assigned to provide gateway service processing for multiple logical networks.

20. The non-transitory machine readable medium of claim 13, wherein the gateway service processing is firewall processing.

\* \* \* \* \*